May 7, 1968 A. J. FAUSTINI 3,381,978
FLUID SEAL CONNECTION
Filed June 14, 1966
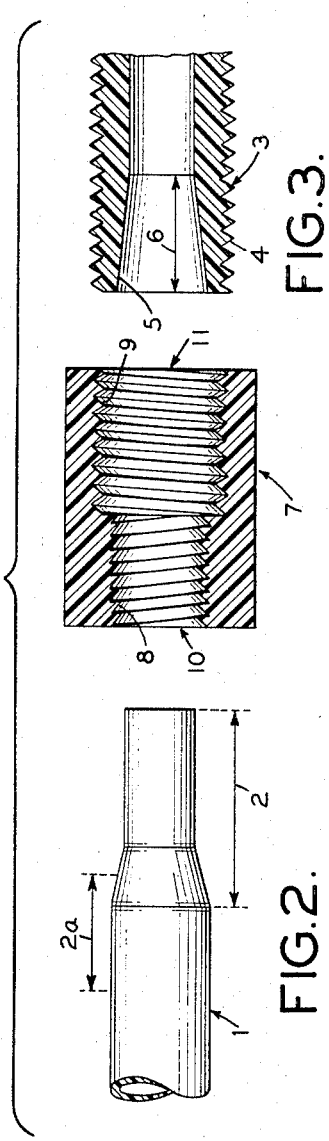
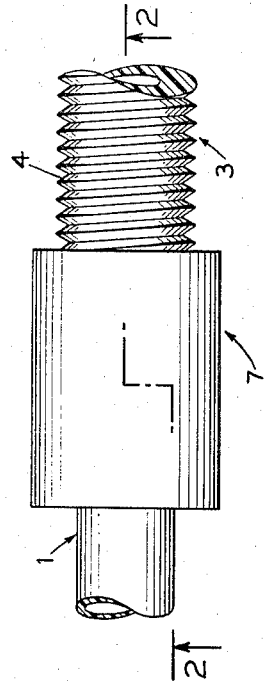
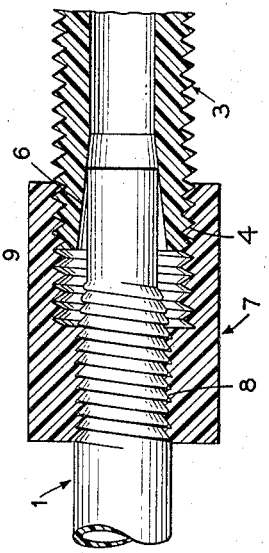
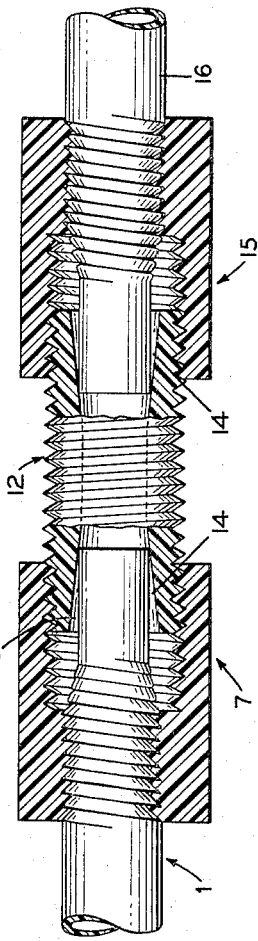
INVENTOR
ALBERT J. FAUSTINI
BY
Henry E. Millson Jr.
ATTORNEY

United States Patent Office 3,381,978
Patented May 7, 1968

3,381,978
FLUID SEAL CONNECTION
Albert J. Faustini, Oakland, Calif., assignor to Warner-Lambert Pharmaceutical Company, Morris Plains, N.J., a corporation of Delaware
Filed June 14, 1966, Ser. No. 557,404
1 Claim. (Cl. 285—40)

ABSTRACT OF THE DISCLOSURE

This invention relates to a novel fluid coupling apparatus which finds utility in connecting fluid carrying tubes or pipes composed of flexible plastic materials. Internally, the coupler is formed with two oppositely threaded sections, one being threaded in the same hand as the external threads of one pipe or tube and the other section being threaded in the opposite hand matching the threading of the second pipe or tube. Rotation of the coupler, after the insertion of the pipes or tubes therein, causes the tubes or pipes to be drawn together in a fluid-tight seal.

---

The present invention relates to a fluid-tight coupling means which enables two pipes to be connected and disconnected quickly through a fluid-tight coupling which when assembled is highly resistant to failure under stress.

One of the problems in the transport of fluids through connecting pipes is the provision of coupling means by which they may be joined to form a seal which is fluid tight, rugged and free from mechanical defects leading to the failure of the seal. This is a particular problem where the pipes are in the form of thin flexible tubing of flexible plastic materials which are easily deformable under stress and which in addition possess a rather low coefficient of friction. Typical of these materials are polyethylene, polypropylene, polytetrafluoroethylene, polytrifluorochloroethylene, etc.

An object of this invention is to provide an inexpensive and reusable coupling means which is particularly useful for joining threaded or unthreaded piping quickly in a strong fluid-tight connection and which is especially useful for connecting sections of thick-walled flexible plastic tubing in a fluid-tight seal. The coupling means, as described hereinafter, is composed of a generally cylindrical coupler formed internally with two oppositely threaded sections. The pipes or tubes to be connected are threaded into the opposite ends of the coupler, and the coupler is then rotated until the tubes or pipes form a fluid-tight connection between them.

Other objects of this invention will appear hereinafter from the following detailed description.

It is to be understood that as used in this specification, the terms "pipe" and "tube" are each meant to include both piping and tubing, as well as the nipples usually provided for making connections to tanks, cylinders, and similar storage vessels for receiving and holding fluid materials.

As shown in the accompanying drawing:

FIG. 1 represents an exploded view of the coupling means in cross section as applied to connecting a narrow, threaded or unthreaded tube to a threaded tube, the latter also being shown in cross section;

FIG. 2 is a partial cross-sectional view of the assembled parts of FIG. 1 in fluid-tight relationship with each other;

FIG. 3 represents an external view of the assembly of FIG. 2; and

FIG. 4 is a partial cross-sectional view of an alternative embodiment of the invention wherein two coupling means are employed to connect two tubes together in fluid-tight relationship with each other.

It is to be understood that like numerals indicate like parts throughout the several figures of the drawing.

Referring now to FIG. 1, there is shown a pipe 1 having a tapered or drawn end portion 2 of reduced diameter, which is to be connected to form a fluid-tight seal with another pipe, tube or nipple 3. Pipe 1 can optionally be formed with a threaded portion along section 2a which is identical in hand to threads 8 of coupler 7 described hereinafter, although the threads along section 2a usually are formed by the first assembly of the apparatus of the invention, also as described hereinafter. Pipe 3 to which pipe 1 is to be connected is provided with external threads 4. Threads 4 may be either right hand or left hand threads. Pipe 3 is hollow, having a bore 5 through which fluid can pass. Pipe 3 can be of the same or of different external diameter than that of pipe 1. The end of bore 5 is in the form of a truncated cone 6, which tapers from the tip of pipe 3 to the uniform internal diameter of bore 5. The uniform internal diameter of bore 5 must be less than the external diameter of drawn end portion 2 of pipe 1. The connection between pipe 1 and pipe 3 is effected by means of coupler 7 which is of a generally cylindrical shape externally and is formed with internal threads 8 which can be either right or left hand threads, and internal threads 9 which are of the same hand as external threads 4 on tube 3 and are opposite in hand from those of threads 8. Internal threads 8 are preferably formed in coupler 7 for a distance less than half the length thereof while threads 9 preferably are formed for a distance greater than half the length of coupler 7.

To connect pipes 1 and 3 in a fluid-tight relationship with each other, pipe 1 is threaded into open end 10 of coupler 7 and pipe 3 is threaded into the opposite end 11 of coupler 7. The threading is accomplished by rotating coupler 7. This rotation causes threads to be formed on pipe 1, if threads are not already present, of the same hand as threads 8, and since threads 8 and 9 are of opposite hand, the rotation also causes pipes 1 and 3 to be drawn toward each other so that when the rotation is continued sufficiently, tapered end 2 of pipe 1 will be firmly seated in the truncated cone section 6 of bore 5 of pipe 3 tightly enough to prevent any fluid leak, as shown in FIGS. 2 and 3 which show the apparatus in assembled form.

Referring to the embodiment of the invention shown in FIG. 4, tube 1 and coupler 7 and the relative hand of their threadings, are identical to those of the same number in FIG. 2. In place of tube 3 in FIG. 2, a connector 12 is employed which is formed with a bore 13, which has truncated cone sections 14 at both ends of the bore. Connector 12 is threaded similarly to the threads in tube 3 in FIG. 2 in order to properly engage coupler 7. The opposite end of connector 12 is engaged by coupler 15, which also engages pipe 16. The threading in coupler 15 is identical in hand to that of coupler 7, so that coupler 15, pipe 16, and connector 12 are assembled and rendered fluid-tight in the same manner as coupler 7, pipe 1 and the other end of connector 12 as described above.

Obvious variations of the invention can be made without departing from the scope or spirit of the invention.

What is claimed is:

1. In combination, an apparatus composed of flexible plastic material comprising
(A) a tube having a first cylindrical external surface, a second cylindrical external surface having a diameter less than said first surface, and a tapered external surface connecting said first and second surfaces, said tube having a radial end face extending from the bore of the tube to said second surface;

(B) a tubular member having
- (a) an externally threaded end portion, and
- (b) a bore having a truncated conical end portion adapted to receive the second external cylindrical surface of said tube in fluid-tight relationship; and (C) a coupler having two internally threaded sections, the first internally threaded section adapted to receive said tube and to form threads on said tapered surface and a portion of said first surface, and the second internally threaded section adapted to receive the externally threaded end portion of said tubular member, said first and second internally threaded sections being threaded opposite in hand.

References Cited

UNITED STATES PATENTS

| 1,664,125 | 3/1928 | Lowrey | 285—334.4 X |
| 1,781,091 | 11/1930 | Wilson | 285—175 |
| 2,042,603 | 6/1936 | Key | 285—175 X |
| 2,580,818 | 1/1952 | Mundy et al. | 285—40 |
| 2,906,152 | 9/1959 | Brase | 285—175 X |
| 3,204,988 | 9/1965 | Ouderkirk et al. | 285—40 |

FOREIGN PATENTS

| 539,214 | 4/1957 | Canada. |
| 633,182 | 12/1949 | Great Britain. |

EDWARD C. ALLEN, *Primary Examiner.*

THOMAS F. CALLAGHAN, *Examiner.*